Aug. 7, 1962     M. UMANOFF     3,048,208
NUT-SHELL REMOVING DEVICE
Filed May 26, 1960
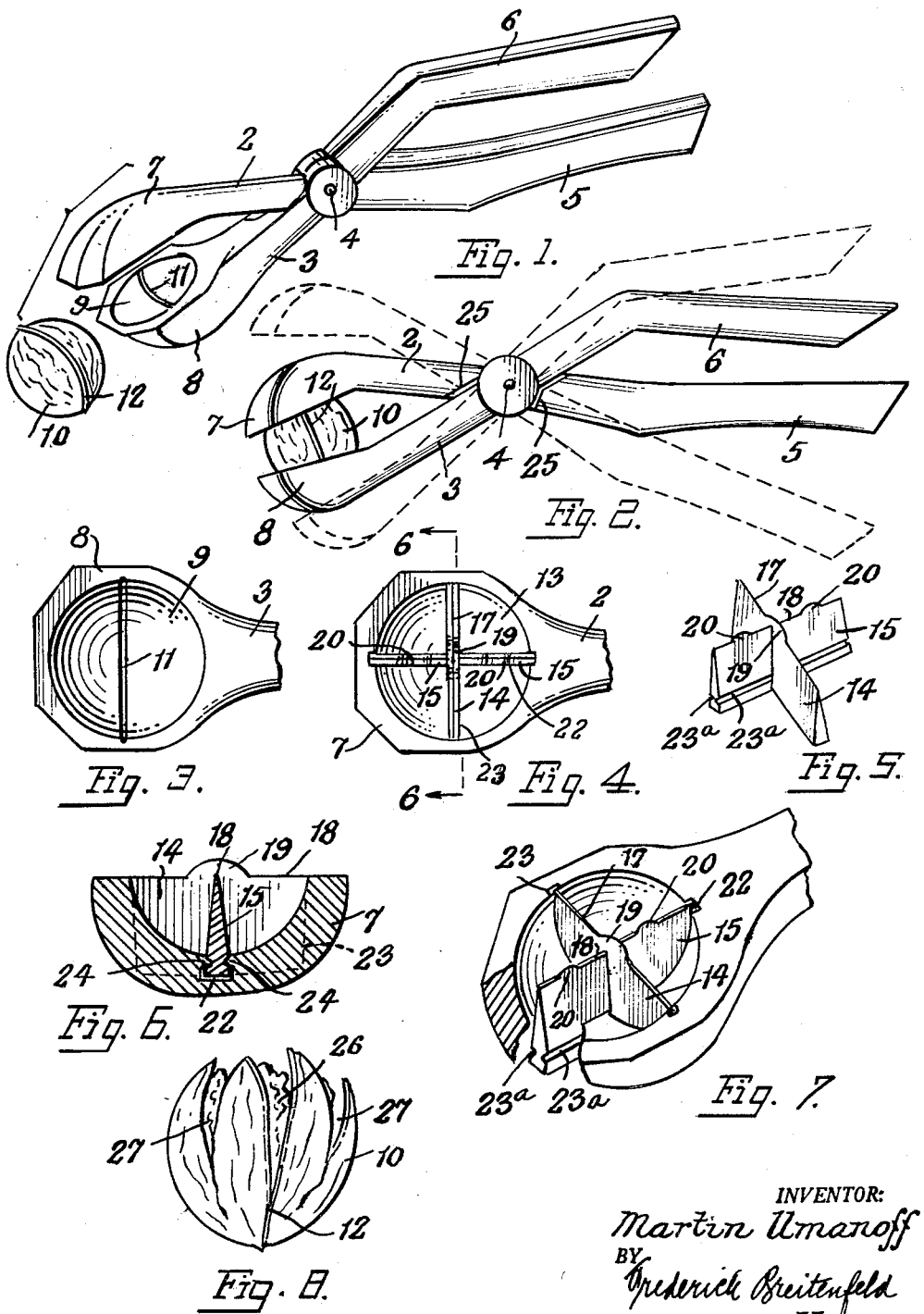
INVENTOR:
Martin Umanoff
BY
Frederick Breitenfeld
Attorney

United States Patent Office 3,048,208
Patented Aug. 7, 1962

3,048,208
NUT-SHELL REMOVING DEVICE
Martin Umanoff, Huntington, N.Y., assignor, by mesne assignments, to R. A. MacPlum Industries, Inc., a corporation of New Jersey
Filed May 26, 1960, Ser. No. 31,864
3 Claims. (Cl. 146—13)

This invention relates to nut-shell removers and has particular reference to a device for effectively stripping the shell of a walnut, or of any nut having similar characteristics.

The chief objective of the invention lies in the provision of a device which is particularly adapted to cracking and splitting the shells of walnuts in such a way that the shells are divided sectionally, preferably into quarter sections, without crushing the meat or kernel of the nut.

One of the disadvantages encountered in nutcrackers of conventional type is the tendency of the devices to crack the shell into many small pieces and to crush and break up the kernel. This disadvantage follows from the fact that in the usual nutcracker no means is provided for insuring the proper positioning of the nut between the jaws of the nutcracker to assure splitting apart of the halves of the shell without crushing the nut meat; and in addition no means is provided for limiting movement of the jaws toward each other. The result is that both the shell and the kernel of the nut are commonly broken into small pieces.

It is a principal object of the present invention to provide a nut-shell remover in which the nut will always be positioned between the jaws in a desired predetermined orientation to insure splitting of the shell along its seam, and to provide cutting means on the jaws for splitting the shell into sections which permit the removal of the kernel intact and unimpaired.

It is another object of the invention to provide means for limiting the pivotal movement of the jaws in a direction toward each other, to thereby control the extent of the forceful movement imposed on the nut shell by the jaws.

It is a further object of the invention to provide a nut-shell remover with cutting or cracking blades which first operate to split the shell along the joint or seam between the two halves of the shell and then upon further compression of the nut between the jaws to crack the shell along lines at right angles to the joint, thus breaking the shell into approximately quarter sections in order to expose and free the nut meat without crushing it.

A general objective is to achieve these desirable results by means of an instrument of novel and unusual structural character which is not only practical and inexpensive from the standpoint of manufacture, but easy and safe to use, reliable in its operation, and staunch and wear-resistant.

One way of achieving these objects and advantages, and such other objectives and benefits as may hereinafter appear or be pointed out, is illustrated in the accompanying drawings, in which—

FIG. 1 is a perspective view of a nut-shell remover constructed in accordance with the invention and a walnut in readiness to be placed between the jaws of the device;

FIG. 2 is a side elevational view of the nut-shell remover showing the nut in position between the jaws;

FIG. 3 is a top view on an enlarged scale of one of the jaws showing the special groove for receiving the rib-like joint of a walnut;

FIG. 4 is a similarly enlarged view of the other of the jaws which accommodates the cutting blades for splitting the shell;

FIG. 5 is a similarly enlarged perspective view of the cutting blades;

FIG. 6 is a similarly enlarged sectional view, taken substantially on the line 6—6 of FIG. 4;

FIG. 7 is a similarly enlarged fragmentary perspective view of the jaw and blades shown in FIG. 4; and FIG. 8 shows a walnut which has been shelled by the present device.

The nut-shell remover as disclosed in the drawing includes a pair of jaws shown respectively at 2 and 3, pivotally connected by the pivot pin 4. The jaw 2 extends rearwardly to define a handle portion 5, and the jaw 3 extends rearwardly to the handle portion 6.

Formed on the forward end of the jaw 2 is an enlarged head 7; and a similar head 8 is provided on the forward end of the jaw 3. The elements of the device as thus far described may be made of metal, or preferably of plastic material of suitable strength and toughness.

Formed in the head 8 is a concavity or recess 9 large enough to receive a walnut 10. Provided in the concavity 9 is a transverse recess or groove 11 adapted to receive, and act as a seat for, the rib-like joint 12 found in every walnut. This arrangement is such that it provides for the placement and retention of the walnut in a predetermined position in the head 8. The reason for the desirability of thus predetermining the orientation of the nut between the heads 7 and 8 will be pointed out below.

The head 7 is formed with a concavity shown at 13 adapted to receive a pair of crossed blades indicated at 14 and 15, which bisects each other. The blades are preferably arranged at right angles to each other, and are formed as a separate unit. The blade 14 is provided with a cutting edge 17, and the blade 15 is provided with a cutting edge 18. The cutting edges are not straight, but rather the edge 17 has an outwardly projecting convex region 19 at its midpoint, and the edge 18 has a similar region 20 at the midpoint of each of its halves. Furthermore, the cutting edge 17 extends slightly beyond the cutting edge 18 so that it encounters the seam of the nut shell before the edge 18 becomes effective. In addition it is preferable to arrange the blade 14 at a slight inclination (so that the intersection 28, FIG. 7, is not accurately 90° to the edge 18) whereby the shell splitting action of the edge 17 is enhanced as it enters the crack between the shell halves.

The blade unit as above described is maintained in the concavity 13 by means of slots 22 and 23 formed in the head 7. The blade 15 is provided near its lower edge with longitudinal grooves 23a and the slot 22 is formed with two opposed ribs 24 preferably integral with the material of the head 7. When the blades 14 and 15 are fitted into the slots 22 and 23, the ribs 24 snap into the grooves 23a in the blade, thus holding the blade unit in place in the concavity. Note that the blade 14 lies in the same plane as the groove 11 in the head 8.

When it is desired to shell a walnut, the nut is placed in the concavity 9 with its rib-like joint 12 fitted in the groove 11. The handles 5 and 6 are then compressed to move the jaws toward one another. The movement of the jaws toward each other is limited by shoulders 25 formed on the jaws near the pivot 4. In this way, the jaws are not permitted to come close enough to crush the nut.

When pressure is applied to the nut, the cutting edge 17 of the blade 14, which lies in the same plane as the joint 12 of the nut, enters the joint 12 of the nut and starts to separate the shell along the joint into half sections. The fact that the blade 14 is canted slightly, as mentioned above, aids it in separating the shell halves. Also, since the blade 14 extends outwardly beyond the blade 15, the shell begins to separate before the latter blade contacts it. Upon further movement of the heads 7 and 8 toward each other, the edge 18 of the blade 15 contacts the shell of the nut thus cutting it along lines which divide each half shell of the nut in half. This is shown in FIG. 8 wherein a nut 10 is shown separated at 26 along its joint 12, and cut along longitudinal lines 27 midway between each half shell. The cracking of the shell in this manner will result in the division of the shell roughly into quarter sections, leaving the kernel or meat intact and easily separable from the sections of the shell.

The shell removing operation described above is performed almost instantaneously, as pressure is applied to the handles of the device, and the clean-cut splitting of the shell in the manner referred to, and as indicated in FIG. 8, is reliably accomplished with unusual effectiveness, time after time.

The construction of the device is such that it can be inexpensively made from various materials and if made of plastic, polypropylene or high impact styrene can be used. The blade unit can be made of any suitable metal such as steel, aluminum or brass and is preferably non-rusting. The shell remover operates extremely well even when the blades 14 and 15 are not provided with the convex regions 19 and 20. However, the presence of these regions has been found to improve the performance.

In many respects it will be understood that the details herein described and illustrated may be altered by those skilled in the art, without necessarily departing from the spirit and scope of the invention as expressed in the appended claims.

What is claimed is:

1. A nut-shell remover comprising a pair of pivotally connected jaws, each of the jaws having a head at one end, each head having a concavity, the first of the concavities having a grove to receive the rib-like joint between the halves of a walnut, the second concavity having groves into which a pair of crossed blades is fitted, one of said last-mentioned grooves being parallel to the groove in said first concavity, the blades having free knife edges facing the first concavity, the edge on the blade in the parallel groove being disposed in advance of the edge of the other blade, whereby said advanced edge will split the shell of the nut along the joint between its halves and the other blade will thereafter divide the shell into approximate quarter sections.

2. A nut sheller comprising a pair of jaws pivotally connected intermediate their ends, each jaw having a handle at one end and a head at the opposite end, means on the jaws for limiting the pivotal movement of the heads in a direction toward each other, one of the heads having a concavity provided with a groove to accommodate the rib-like joint betwen the halves of a walnut, the other head having a concavity provided with crossed slots for accommodating a pair of crossed knife-like blades, one of said blades lying in the same plane as said groove, the knife edge on said one of said blades extending beyond the knife edge on the second blade, whereby upon movement of the jaws toward each other, the edge on said one of said blades will split the shell of the nut along its joint before the edge of the other of said blades contacts the nut.

3. A nut sheller as provided for in claim 2, wherein the sides of at least one of the blades is grooved longitudinally, and at least one of said crossed slots is provided with an overhanging rib for engagement with the groove in the blade to thereby hold the blades in the concavity in which they are arranged.

References Cited in the file of this patent

UNITED STATES PATENTS

| | | |
|---|---|---|
| 2,224,415 | Tonn | Dec. 10, 1940 |
| 2,378,084 | Jackson | June 12, 1945 |
| 2,596,382 | Duke | May 13, 1952 |
| 2,731,994 | Snell | Jan. 24, 1956 |

FOREIGN PATENTS

| | | |
|---|---|---|
| 582,559 | Germany | Aug. 17, 1933 |
| 132,373 | Sweden | July 17, 1951 |
| 78,620 | Denmark | Dec. 6, 1954 |